(12) United States Patent
Li et al.

(10) Patent No.: US 11,283,352 B2
(45) Date of Patent: Mar. 22, 2022

(54) MODULAR MULTILEVEL DYNAMIC SWITCHING DC-DC TRANSFORMER

(71) Applicant: Tianjin University, Tianjin (CN)

(72) Inventors: Bin Li, Tianjin (CN); Weixin Zhang, Tianjin (CN)

(73) Assignee: Tianjin University, Tianjin (CN)

( * ) Notice: Subject to any disclaimer, the term of this patent is extended or adjusted under 35 U.S.C. 154(b) by 0 days.

(21) Appl. No.: 16/085,585

(22) PCT Filed: Jan. 29, 2018

(86) PCT No.: PCT/CN2018/074453
§ 371 (c)(1),
(2) Date: Dec. 3, 2018

(87) PCT Pub. No.: WO2019/029138
PCT Pub. Date: Feb. 14, 2019

(65) Prior Publication Data
US 2021/0203227 A1  Jul. 1, 2021

(30) Foreign Application Priority Data

Aug. 5, 2017 (CN) .......................... 201710663482.2

(51) Int. Cl.
*H02M 3/158* (2006.01)
*H02M 1/42* (2007.01)

(52) U.S. Cl.
CPC .......... *H02M 3/158* (2013.01); *H02M 1/4233* (2013.01)

(58) Field of Classification Search
CPC ............. H02M 1/0003; H02M 1/0006; H02M 1/0045; H02M 1/0064; H02M 1/007;
(Continued)

(56) References Cited

U.S. PATENT DOCUMENTS 9,893,633 B1 * 2/2018 Li .................. H02M 3/33546
2005/0083716 A1 * 4/2005 Marquardt ............ H02M 5/271
363/132
(Continued)

FOREIGN PATENT DOCUMENTS

CN   105743352   *   4/2016   ............ H02M 3/335

*Primary Examiner* — Matthew V Nguyen
(74) *Attorney, Agent, or Firm* — George G. Wang; Bei & Ocean

(57) ABSTRACT

The present invention discloses a modular multilevel dynamic switching DC-DC transformer, which consists of N DC-DC sub-modules connected in series. Each of the DC-DC sub-modules is of a symmetrical structure capable of realizing bidirectional power flow, which consists of two half-bridge sub-modules and isolating switches $S_1$, $S_2$ between capacitors $C_1$, $C_2$ of the two half-bridge sub-modules. The capacitors $C_1$, $C_2$ are disposed in parallel between the half-bridge sub-modules and the isolating switches. Assuming that the power flows in the primary side of the DC-DC transformer and flows out from the secondary side; the half-bridge sub-module located on the primary side of the DC-DC transformer is referred to as a primary-side sub-module; and, the half-bridge sub-module located on the secondary side of the DC-DC transformer is referred to as a secondary-side sub-modules. By turning on or off the switching devices, the switch-on or switch-off of the primary-side sub-module or the secondary-side sub-module can be realized, leading to the dynamic switching in four different operating states of the DC-DC transformer and realizing the voltage conversion and energy exchange. Compared with the prior art, the present invention is able to change the transformer ratio dynamically, realizing the control of the DC power flow, and, greatly decreases the number of sub-modules, has remarkable economic efficiency, can effectively reduce the size of DC-DC transformers, and it is advantageous for popularization.

1 Claim, 3 Drawing Sheets

(58) Field of Classification Search
CPC ...... H02M 1/4233; H02M 3/07; H02M 3/155; H02M 3/156; H02M 3/158; H02M 1/0095; H02M 7/4835; H02J 1/10
See application file for complete search history.

(56) References Cited

U.S. PATENT DOCUMENTS

| | | | | |
|---|---|---|---|---|
| 2013/0038303 | A1* | 2/2013 | Krause | H02M 3/1584 |
| | | | | 323/271 |
| 2015/0124506 | A1* | 5/2015 | Sahoo | H02M 7/483 |
| | | | | 363/126 |
| 2015/0357906 | A1* | 12/2015 | Jung | H02M 1/32 |
| | | | | 363/56.03 |
| 2018/0076723 | A1* | 3/2018 | Li | H02J 7/04 |

* cited by examiner (a)

(b)

(c)

(d)

MODULAR MULTILEVEL DYNAMIC SWITCHING DC-DC TRANSFORMER

TECHNICAL FIELD

The present invention relates to the technical field of power electronics, and in particular to a dynamic switching design scheme for a modular DC-DC transformer.

BACKGROUND OF THE PRESENT INVENTION

Since the renewable energy sources are characterized by fluctuation and intermittency, the large-scale access of new energy sources such as wind energy and photovoltaic energy to a power grid will have a significant impact on the safe and stable operation of the AC power grid. By a flexible DC power transmission technology, effective solutions are provided for solving the problems such as the large-scale centralized access of wind and photovoltaic power, interconnection of power grids, and power supply to cities and islands. DC-DC transformers are the key devices for realizing DC multi-voltage level conversion and DC power flow control.

At present, scholars both in China and at abroad have proposed numerous DC-DC transformer conversion topologies. Isolated modular multilevel DC-DC transformers have been widely adopted, but still have the disadvantages of complicated structure, large size, low economic efficiency and complicated control system.

SUMMARY OF THE PRESENT INVENTION

In order to solve the existing DC voltage conversion and power flow control problems in the DC grid in a more economical and flexible way, considering the equipment size and economic efficiency, the present invention proposes a modular multilevel dynamic switching DC-DC transformer based on the independent dynamic switching of the sub-modules on primary and secondary side.

The present invention proposes a modular multilevel dynamic switching DC-DC transformer, which consists of N DC-DC sub-modules connected in series; each of the DC-DC sub-modules is of a symmetrical structure capable of realizing bidirectional power flow and consists of two half-bridge sub-modules and isolating switches $S_1$, $S_2$ between capacitors $C_1$, $C_2$ of the two half-bridge sub-modules; and, the capacitors $C_1$, $C_2$ are disposed in parallel between the half-bridge sub-modules and the isolating switches; and Assuming that the power flows in the primary side of the DC-DC transformer and flows out from the secondary side, $U_1$ and $U_2$ are voltages on the primary side and the secondary side of the DC-DC transformer, respectively; the half-bridge sub-module located on the primary side of the DC-DC transformer is referred to as a primary-side sub-module; the half-bridge sub-module located on the secondary side of the DC-DC transformer is referred to as a secondary-side sub-module; in a single half-bridge sub-module, in addition to two serially-connected switching devices each consisting of IGBTs $T_1$, $T_2$ and antiparallel diodes $D_1$, $D_2$, a switching device consisting of an IGBT $T_3$ and an antiparallel diode $D_3$ is additionally provided; and the additional switching device consisting a $T_3$ and a $D_3$ is used for preventing the current from flowing between the primary-side sub-module and the secondary-side sub-module in operating state 4 (see below); and, by turning on or off the switching devices, the switch-on or switch-off of the primary-side sub-module and the secondary-side sub-module can be realized.

For the primary-side half-bridge sub-module, when $T_1$ and $T_3$ are switched on and $T_2$ is switched off, capacitor $C_1$ is connected to the primary side of the DC system, and as power flows in, the capacitor voltage $U_{C1}$ rises. While when $T_1$ and $T_3$ are switched off and $T_2$ is switched on, capacitor $C_1$ is isolated from the primary side of the DC system and there no energy exchange between the primary side and $C_1$. Similarly, the secondary-side half-bridge sub module operates in the same manner except for the direction of power flow. In each DC-DC sub-module, the primary-side sub-module and the secondary-side sub-module are allowed to be controlled independently, without influencing their switching states one another. Thus there can be four different operating states for each DC-DC sub-module which consists of two half-bridge sub-modules.

The DC-DC sub-modules have the following four operating states:

Operating state 1: the primary-side sub-module is in a switch-on state, the secondary-side sub-module is in a switch-off state, and the isolating switches $S_1$, $S_2$ are in an OFF-state; wherein, in this case, the capacitor $C_1$ in the primary-side sub-module is charged and the capacitor voltage $U_{C1}$ rises, and, the capacitor $C_2$ in the secondary-side sub-module is neither charged nor discharged and the capacitor voltage $U_{C2}$ remains unchanged;

Operating state 2: the primary-side sub-module is in a switch-off state, the secondary-side sub-module is in a switch-on state, and the isolating switches $S_1$, $S_2$ are in an OFF-state; wherein, in this case, the capacitor $C_1$ in the primary-side sub-module is neither charged nor discharged and the capacitor voltage $U_{C1}$ remains unchanged, and, the capacitor $C_2$ in the secondary-side sub-module is discharged and the capacitor voltage $U_{C2}$ decreases;

Operating state 3: both the primary-side sub-module and the secondary-side sub-module are in a switch-on state and the isolating switches $S_1$, $S_2$ are in an OFF-state; wherein, in this case, the capacitor $C_1$ in the primary-side sub-module is charged and the capacitor voltage $U_{C1}$ rises, and, the capacitor $C_2$ in the secondary-side sub-module is discharged and the capacitor voltage $U_{C2}$ decreases;

Operating state 4: both the primary-side sub-module and the secondary-side sub-module are in a switch-off state and the isolating switches $S_1$, $S_2$ are in an ON-state; wherein, in this case, the capacitors in both the primary-side sub-module and the secondary-side sub-module do not exchange energy with power grids that are connected to the primary side and the secondary side of the DC-DC transformer, and $U_{C1}$ is higher than $U_{C2}$; the capacitor $C_1$ in the primary-side sub-module charges the capacitor $C_2$ in the secondary-side sub-module, and the energy is transferred from the primary-side sub-module to the secondary-side sub-module; when $U_{C1}$ is equal to $U_{C2}$, the charging process ends; and, in the operating state 4, the power of the DC-DC transformer flows from the primary side to the secondary side, and the capacitor voltage of the sub-modules on both sides remain equal.

Compared with the prior art, the present invention has the following beneficial effects:

Firstly, by dynamically changing a switching proportion of primary-side/secondary-side sub-module, the transformation ratio may be flexibly adjusted online;

Secondly, by finely adjusting the transformation ratio, the power transmission is flexibly controlled, and the DC power flow control is realized;

Thirdly, compared with the isolated modular multilevel DC-DC transformers which have been widely adopted at present, the present invention greatly reduces sub-modules, does not require an AC transformer, and has remarkable economic efficiency; moreover, since the number of the required capacitors is greatly decreased, the size of the DC-DC transformer can be effectively reduced, and it is advantageous for popularization.

DETAILED DESCRIPTION OF THE PRESENT INVENTION

The implementations of the present invention will be further described below in detail with reference to the accompanying drawings.

Figure 1:
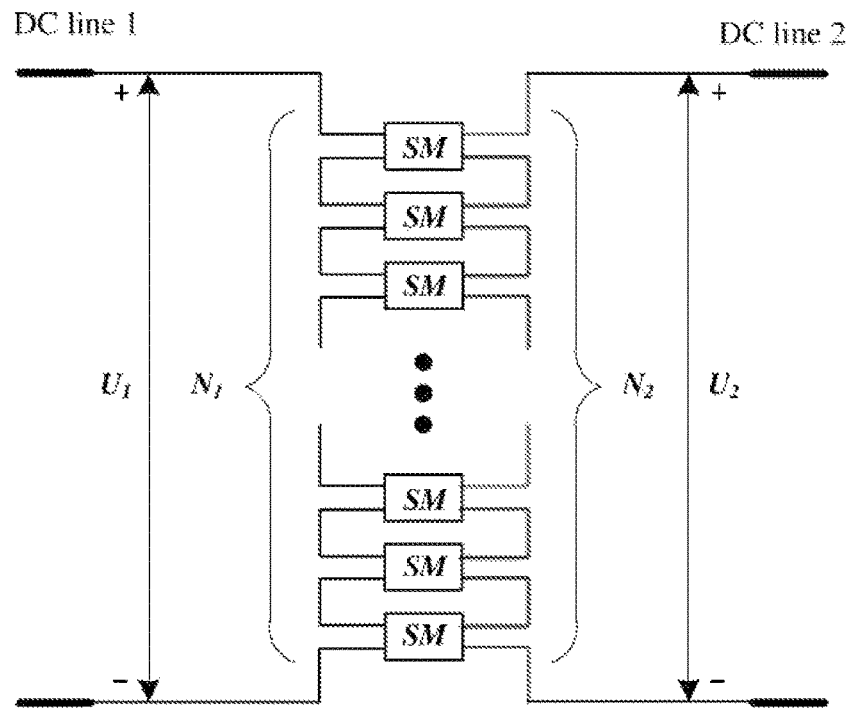
FIG. 1 is a schematic diagram of a topological structure of a modular multilevel dynamic switching DC-DC transformer according to the present invention.

FIG. 1 shows a schematic diagram of a topological structure of a modular multilevel dynamic switching DC-DC transformer according to the present invention. The DC-DC transformer consists of N sub-modules connected in series. $U_1$ and $U_2$ are voltages on the primary side and the secondary side, respectively. $N_1$ and $N_2$ are the numbers of switched-on sub-modules on the primary side and the secondary side, respectively. As shown in FIG. 1, SM (Sub Modular) represents a DC-DC sub-module.

Figure 2:
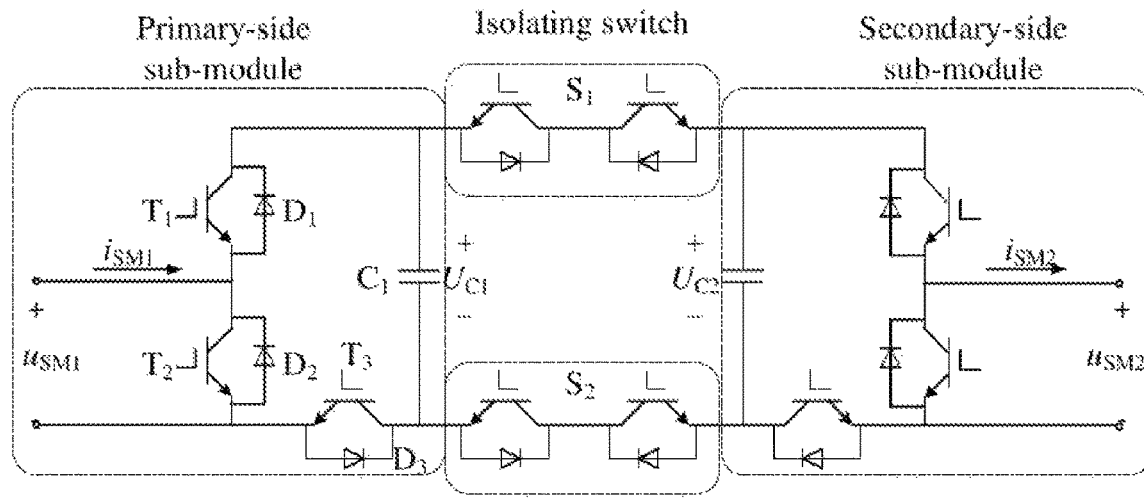
FIG. 2 is a schematic structure diagram of a DC-DC sub-module of the modular multilevel dynamic switching DC-DC transformer according to the present invention.
Figure 3A:
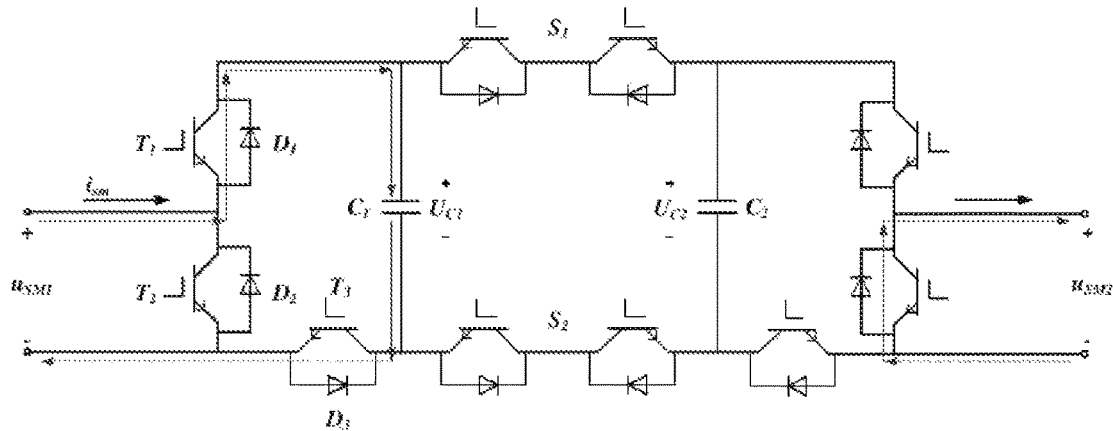
FIG. 3 shows operating states of the DC-DC sub-modules, where FIG. 3($a$) shows an operating state 1 of a DC-DC sub-module, FIG. 3($b$) shows an operating stage 2 of a DC-DC sub-module, FIG. 3($c$) shows an operating state 3 of a DC-DC sub-module, and FIG. 3($d$) shows an operating state 4 of a DC-DC sub-module.
Figure 3A:
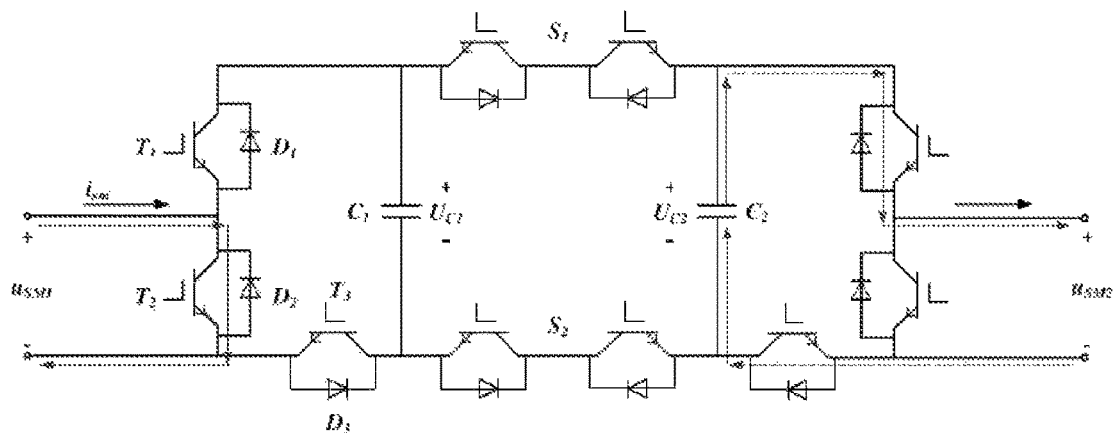
Figure 3A:
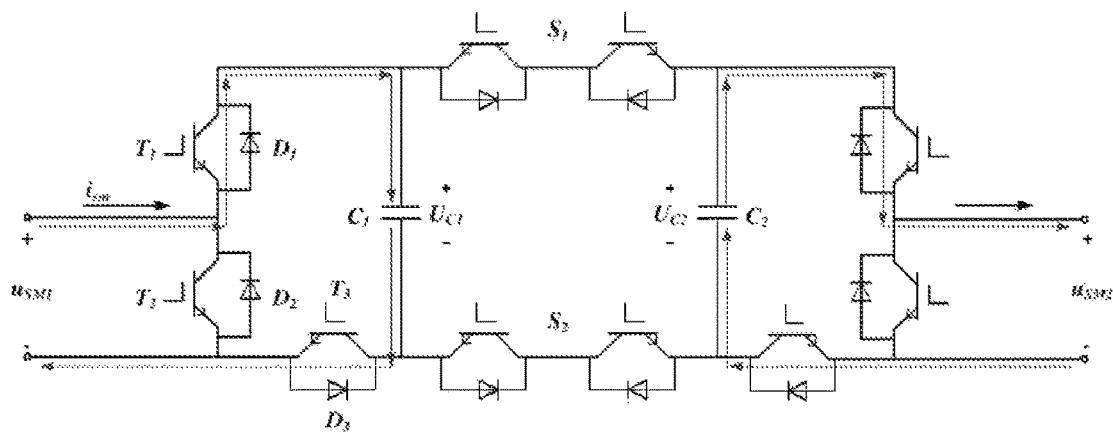
Figure 3B:
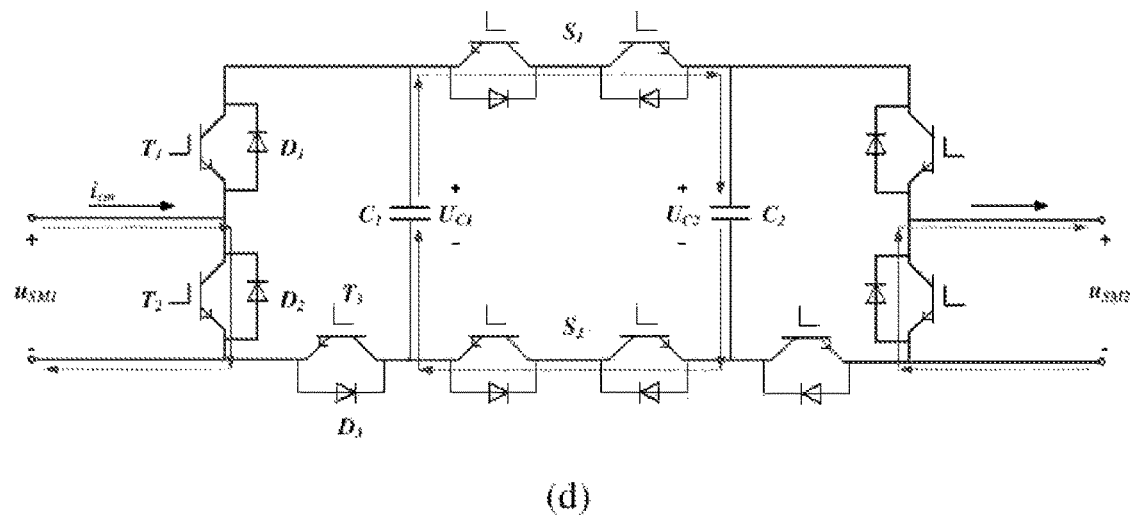

FIG. 2 shows a schematic structure diagram of a DC-DC sub-module of the modular multilevel dynamic switching DC-DC transformer according to the present invention. Each of the DC-DC sub-modules is of a symmetrical structure capable of realizing bidirectional power flow, which consists of two half-bridge sub-modules and isolating switches $S_1$, $S_2$ between capacitors $C_1$, $C_2$ of the two half-bridge sub-modules. The capacitors $C_1$, $C_2$ are disposed in parallel between the half-bridge sub-modules and the isolating switches. In a single half-bridge sub-module, in addition to two serially-connected switching devices each consisting of IGBTs $T_1$, $T_2$ and antiparallel diodes $D_1$, $D_2$ (the same structure as a conventional half-bridge sub-module MMC converter station), a switching device consisting of an IGBT $T_3$ and an antiparallel diode $D_3$ is additionally provided. The additional switching device consisting a $T_3$ and a $D_3$ is used for preventing the current from flowing between primary-side sub-module and secondary-side sub-module in a certain operating state.

Assuming that the power flows in the primary side of the DC-DC transformer and flows out from the secondary side, $U_1$ and $U_2$ are voltages on the primary side and the secondary side of the DC-DC transformer, respectively. The half-bridge sub-module located on the primary side of the DC-DC transformer is referred to as a primary-side sub-module; and, the half-bridge sub-module located on the secondary side of the DC-DC transformer is referred to as a secondary-side sub-module. When the power flows from the primary side to the secondary side, by turning on or off the switching devices, the switch-on or switch-off of the primary-side sub-module and the secondary-side sub-module can be realized. Depending upon different switch-on or switch-off states of the half-bridge sub-modules on both sides, there are four different operating states.

Operating state 1 of sub-modules: as shown in FIG. 3($a$), the primary-side sub-module is in a switch-on state, the secondary-side sub-module is in a switch-off state, and the $S_1$ and $S_2$ are in an OFF-state. In this case, the capacitor $C_1$ in the primary-side sub-module is charged and the capacitor voltage $U_{C1}$ rises; and, the capacitor $C_2$ in the secondary-side sub-module is neither charged nor discharged and the capacitor voltage $U_{C2}$ remains unchanged.

Operating state 2 of sub-modules: as shown in FIG. 3($b$), the primary-side sub-module is in a switch-off state, the secondary-side sub-module is in a switch-on state, and the $S_1$ and $S_2$ are in an OFF-state. In this case, the capacitor $C_1$ in the primary-side sub-module is neither charged nor discharged and the capacitor voltage $U_{C1}$ remains unchanged; and, the capacitor $C_2$ in the secondary-side sub-module is discharged and the capacitor voltage $U_{C2}$ decreases.

Operating state 3 of sub-modules: as shown in FIG. 3($c$), both the primary-side sub-module and the secondary-side sub-module are in a switch-on state and the $S_1$ and $S_2$ are in an OFF-state. In this case, the capacitor $C_1$ in the primary-side sub-module is charged and the capacitor voltage $U_{C1}$ rises; and, the capacitor $C_2$ in the secondary-side sub-module is discharged and the capacitor voltage $U_{C2}$ decreases.

Operating state 4 of sub-modules: as shown in FIG. 3($d$), both the primary-side sub-module and the secondary-side sub-module are in a switch-off state and the $S_1$ and $S_2$ are in an ON-state. In this case, the capacitors in both the primary-side sub-module and the secondary-side sub-module do not exchange energy with power grids that are connected to the primary side and the secondary side of the DC-DC transformer. According to the sub-module switching and voltage balancing control, it can be known that $U_{C1}$ is higher than $U_{C2}$. In this case, the capacitor $C_1$ in the primary-side sub-module charges the capacitor $C_2$ in the secondary-side sub-module and the energy is transferred from the primary-side sub-module to the secondary-side sub-module. When $U_{C1}$ is equal to $U_{C2}$, the charging process is ended. In the operating state 4, the power of the DC-DC transformer flows from the primary side to the secondary side, and the capacitor voltage of the sub-modules on both sides remain equal.

In each sub-module, the primary-side sub-module and the secondary-side sub-module are allowed to be controlled independently, without influencing their switching states one another.

The DC-DC voltage transformation principle, the sub-module switching and voltage balancing control theory and the power flow control principle applicable to the modular multilevel dynamic switching DC-DC transformer of the present invention will be described below.

I. The DC-DC voltage transformation principle will be described below in detail.

In the DC-DC transformer, the switch-on or switch-off state of the half-bridge sub-modules on the primary side and the secondary side is separately determined. The DC voltages $U_1$, $U_2$ on the primary side and the secondary side satisfy the following equation:

$$U_1 = N_1 U_{C1}$$

$$U_2 = N_2 U_{C2} \qquad (1),$$

Where $N_1$ and $N_2$ represent the number of switched-on sub-modules on the primary side and the secondary side, respectively, and $U_{C1}$ and $U_{C2}$ are capacitor voltages of the half-bridge sub-modules on both sides, respectively. The transformation ratio k of the DC-DC transformer satisfies the following equation:

$$\frac{U_1}{U_2} = \frac{N_1 U_{C1}}{N_2 U_{C2}} = \frac{1}{k}. \qquad (2)$$

Since the capacitor voltage of the primary-side sub-modules is approximately equal to that of the secondary-side sub-modules, the equation (2) may be expressed by:

$$\frac{U_1}{U_2} = \frac{N_1}{N_2} = \frac{1}{k}. \qquad (3)$$

It can be known from the equation (3) that the ratio of the number of the primary-side sub-modules to the number of the secondary-side sub-modules in the DC-DC transformer is equal to the transformation ratio of the DC-DC transformer. Thus by changing the number of the switched-on sub-modules on the primary side and the secondary side, the transformation ratio k may be adjusted.

II. The sub-module switching and voltage balancing control theory will be described in detail as follows:

The proposed DC-DC transformer monitors and sorts the capacitor voltages of the half-bridge sub-modules on both sides, and the switching state of each half-bridge sub-module is determined according to the direction of power flow to realize the voltage balancing control of the half-bridge sub-modules on each side. Specifically, when the power flows from the primary side to the secondary side, according to the result of sorting, the $N_1$ half-bridge sub-modules with low sub-module capacitor voltage are preferably switched on, and each switched-on half-bridge sub-module on the primary side is charged, and the capacitor voltage rises; and, the half-bridge sub-modules with high capacitor voltage are switched off, and the corresponding DC-DC sub-module may be in an operating state 2 or 4. If the DC-DC sub-module is in operating state 4, the capacitor voltage of this half-bridge sub-module decreases, and when the capacitor voltage of this half-bridge sub-module is lower than that of the switched-on half-bridge sub-modules, this sub-module will be switched on.

While, each switched-on half bridge sub-module on the secondary side is discharged, the $N_2$ half-bridge sub-modules with high sub-module capacitor voltage are preferably switched on according to the result of sorting, and the capacitor voltage of the sub-module decreases. And, the half bridge sub-modules with low capacitor voltage are switched off, and the corresponding DC-DC sub-module may be in operating state 1 or 4. If this DC-DC sub-module is in operating state 4, the capacitor voltage of this half bridge sub-module on secondary side rises, and when it is higher than that of the switched-on half-bridge sub-module, this half-bridge sub-module will be switched on.

The operating state 4 is a key link for the energy exchange between the primary side and the secondary side of the DC-DC transformer. Since, in the operating state 4, the half-bridge sub-modules on both sides are switched off, it is required to reserve a certain redundancy margin for the half-bridge sub-modules on both sides, and the half-bridge sub-modules on both sides cannot be all switched on.

III. The power flow control principle will be described below in detail.

1. A DC load is connected to the secondary side: the power flow of the DC system is determined by the DC voltage. When a DC load is directly connected to the secondary side of the DC-DC transformer, by dynamically and finely adjusting the transformation ratio k of the DC-DC transformer, the outlet voltage on the secondary side is changed, that is, the active power output to the load on the secondary side may be changed, the equation of the active power may be expressed by:

$$P = \frac{(kU_1)^2}{R_l + R_{load}} \qquad (4)$$

Where $R_l$ is the line resistance on the secondary side, and $R_{load}$ is the equivalent resistance of the load on the secondary side.

2. A DC power grid is connected to the secondary side: when the interconnection of DC power grids is realized by a DC-DC transformer, the power flow control of the power grids can be realized with the DC-DC transformer of the present invention.

Figure 4:
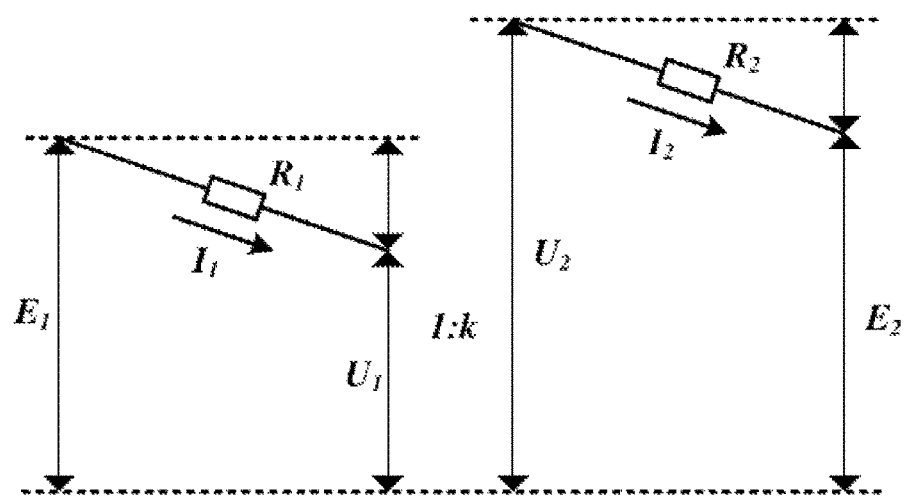
FIG. 4 is a schematic diagram of the power flow in a DC system.

As shown in FIG. 4, $R_1$ and $R_2$ are the line resistance between the primary side and the interconnected DC system 1 and the line resistance between the secondary side and the interconnected DC system 2, respectively. If the voltages of the interconnected power grids are respectively $E_1$ and $E_2$, and the transformation ratio of the DC-DC transformer is k, ignoring the power loss of the DC-DC transformer, the input power and the output power satisfy the following equation:

$$P = \frac{k^3 R_1 E_1 E_3 + k^2 (R_2 E_1^2 - R_1 E_2^2) - k R_2 E_1 E_2}{k^4 R_1^2 + 2k^2 R_l R_1 + R_1^2}. \qquad (5)$$

It can be known from the equation (5) that the transmitted power of the interconnected power grids changes when the transformation ratio k changes.

If the loss of the DC-DC transformer is ignored, when the transformation ratio k satisfies the following condition:

$$k = \frac{E_2}{E_1},$$

the transmitted power between the interconnected power grids is 0. By properly increasing/decreasing the number $N_1$ of switched-on sub-modules on the primary side and the number $N_2$ of switched-on sub-modules on the secondary side, the transformation ratio k may be finely adjusted. When k is slightly higher than $$\frac{E_2}{E_1},$$

the active power is transferred from the primary side to the secondary side; and, when k is slightly lower than $$\frac{E_2}{E_1},$$

the active power flows from the secondary side to the primary side. Based on the above analysis, the present invention can realize the power flow control of the interconnected DC power grids by adjusting the transformer ratio.

Since the DC-DC transformer of the present invention is symmetrically in structure, the analysis on the flow of power from the secondary side to the primary is the same and will not be repeated here.

What is claimed is:

1. A modular multilevel dynamic switching DC-DC transformer, comprising N DC-DC sub-modules connected in series; wherein each of the DC-DC sub-modules is of a symmetrical structure capable of realizing bidirectional power flow, which consists of two half-bridge sub-modules and isolating switches (S1), (S2) between capacitors (C1), (C2) of the two half-bridge sub-modules; and, the capacitors (C1), (C2) are disposed in parallel between the half-bridge sub-modules and the isolating switches; and
   wherein the power flows in the primary side of the DC-DC transformer and flows out from the secondary side, $(U_1)$, $(U_2)$ are voltages on the primary side and the secondary side of the DC-DC transformer, respectively; the half-bridge sub-module located on the primary side of the DC-DC transformer is referred to as a primary-side sub-module; the half-bridge sub-module located on the secondary side of the DC-DC transformer is referred to as a secondary-side sub-module; the half-bridge sub-module each comprises, in addition to two serially-connected switching devices each consisting of IGBTs (T1), (T2) and antiparallel diodes (D1), (D2), a switching device consisting of an IGBT (T3) and an antiparallel diode (D3); and the switching device is used for preventing the current from flowing between the primary-side sub-module and the secondary-side sub-module; and, by turning on or off the switching devices, the switch-on or switch-off of the primary-side sub-module and the secondary-side sub-module is realized,
   wherein, in each DC-DC sub-module, the primary-side sub-module and the secondary-side sub-module are allowed to be controlled independently, without influencing their switching states one another,
   and wherein the DC-DC sub-modules operate in four states which are:
   state 1: the primary-side sub-module is in a switch-on state, the secondary-side sub-module is in a switch-off state, and the isolating switches (S1), (S2) are in an OFF-state, wherein, in this case, the capacitor (C1) in the primary-side sub-module is charged and the capacitor voltage $(U_{C1})$ rises, and, the capacitor (C2) in the secondary-side sub-module is neither charged nor discharged and the capacitor voltage $(U_{C2})$ remains unchanged;
   state 2: the primary-side sub-module is in a switch-off state, the secondary-side sub-module is in a switch-on state, and the isolating switches (S1), (S2) are in an OFF-state, wherein, in this case, the capacitor (C1) in the primary-side sub-module is neither charged nor discharged and the capacitor voltage $(U_{C1})$ remains unchanged, and, the capacitor (C2) in the secondary-side sub-module is discharged and the capacitor voltage $(U_{C2})$ decreases;
   state 3: both the primary-side sub-module and the secondary-side sub-module are in a switch-on state, and the isolating switches (S1), (S2) are in an OFF-state, wherein, in this case, the capacitor (C1) in the primary-side sub-module is charged and the capacitor voltage $(U_{C1})$ rises, and, the capacitor (C2) in the secondary-side sub-module is discharged and the capacitor voltage $(U_{C2})$ decreases; and
   state 4: both the primary-side sub-module and the secondary-side sub-module are in a switch-off state, and the isolating switches (S1), (S2) are in an ON-state, wherein, in this case, the capacitors in both the primary-side sub-module and the secondary-side sub-module do not perform energy exchange with power grids that are connected to the primary side and the secondary side of the DC-DC transformer, and $(U_{C1})$ is higher than $(U_{C2})$; the capacitor (C1) in the primary-side sub-module charges the capacitor (C2) in the secondary-side sub-module, and the energy is transferred from the primary-side sub-module to the secondary-side sub-module; when $(U_{C1})$ is equal to $(U_{C2})$, the charging process ends; and, in the state 4, the power of the DC-DC transformer flows from the primary side to the secondary side, and the capacitor voltage of the sub-modules on both sides remain equal.

* * * * *